Patented Jan. 13, 1942

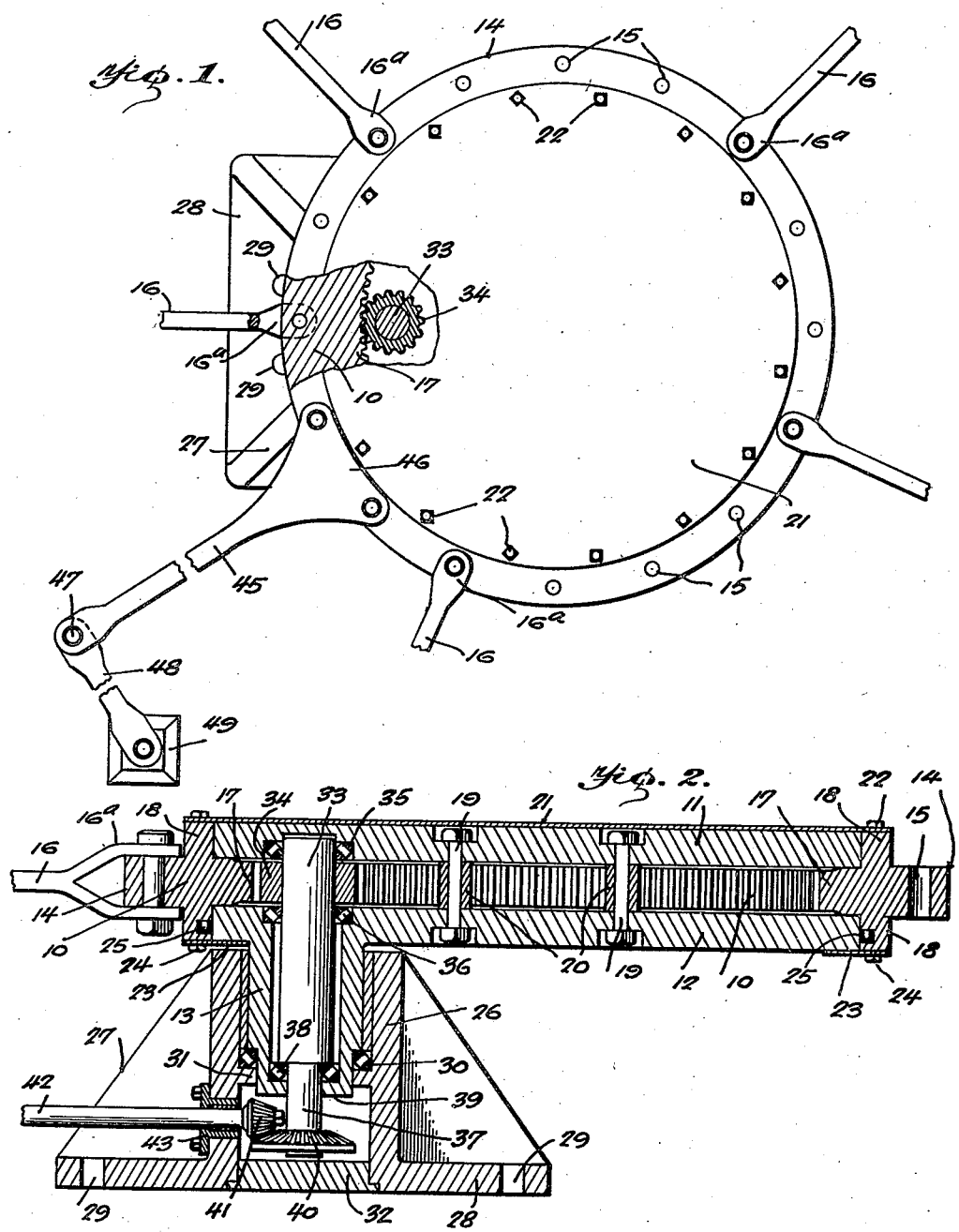

2,269,730

UNITED STATES PATENT OFFICE 2,269,730

CENTRAL POWER

Charles M. O'Leary, Houston, Tex.

Application March 5, 1941, Serial No. 381,793

8 Claims. (Cl. 74—51)

The present invention relates generally to what are commonly known in oil field practise as central powers, which are in the nature of stationary gear units having an upstanding low speed shaft on which a crank arm is fixed at one end with a crank disc rotatable on its other end, the disc having an annular series of openings, into all, or selected, of which openings shackles may be extended for connecting to the power the adjacent ends of a series of radiating pull rods connecting the power with pump jacks at the wells for which the power acts as a central operating unit.

These central powers, as now in well known service, necessitate the above mentioned crank arm and crank disc in addition to a casing of a nature adapted to house the reducing gears, and involve a considerable number of expensive bearings incident to such gears, and are altogether costly, cumbersome, and difficult to effectively lubricate.

It is a general object of the present invention to provide a central power well adapted to effectively perform all of the functions of the present powers, and which will, at the same time, be substantially less expensive with equal strength and durability, as compared with those now used.

A further object of the invention is the provision of a central power which eliminates the necessity of the present heavy crank arm and crank disc, and presents an arrangement capable of ready and effective lubrication.

The foregoing and other objects of the invention may be better understood and more thoroughly appreciated in the course of the following detailed description of a form of construction at present deemed best adapted to its introduction into practical use, and by reference to the accompanying drawing, illustrating the same and forming a part of this specification, and in which drawing:

Figure 1 is a top plan view of the central power embodying the invention, a portion thereof being broken away and in section, and, Figure 2 is a vertical transverse sectional view taken therethrough in line with the engaging gear members.

Referring now to the above described figures of the drawing, the invention contemplates the use of a shaftless ring gear 10, disposed horizontally between, and projecting peripherally beyond, a pair of guide discs 11 and 12, the lower of which discs is provided with a depending, eccentrically disposed, tubular bearing sleeve 13.

The ring gear 10 has an external, annular median rib 14 which is provided with an annular series of openings 15, disposed parallel to the axis of the gear, for receiving the shackles 16ª of the pull rods 16, which may thus lead from various points around the gear to the wells to be served by the central power.

The ring gear 10 also has an internal, annular, median and toothed rib 17, and laterally projecting, annular flanges 18, outstanding at right angles to, and between, the outer and inner ribs 14 and 17, and with the inner faces of which flanges 18, the guide discs 11 and 12 are in peripheral bearing contact at opposite sides of the inner toothed rib 17. These guide discs 11 and 12 are rigidly connected to each other, as by means of bolts 19, passing through the space within the shaftless ring gear 10. Spacing sleeves 20, around said bolts 19 between the discs, serve to rigidly space the guide discs in their peripheral bearing relation to the inner surfaces of the flanges 18, and side bearing relation against the side surfaces of the toothed rib 17.

The guide discs 11 and 12, which are thus connected as a unit to rotate within the ring gear, are preferably of no greater thickness than the widths of the flanges 18 of said gear, to thus permit of the use of closure members above and below the gear and overlapping the circular joints between the peripheries of the discs and the flanges 18. As plainly seen in Figure 2, the upper closure member is in the form of a circular cover plate 21, secured by bolts 22 around its edge, to the upper flange 18 and extending completely over the upper disc 11. The lower closure member is in the form of a flat ring 23, secured by bolts 24 around its outer edge, to the lower flange 18 of the gear 10, and extending inwardly but a short distance, over the outer portion of the lower disc 12, to approximately the outer limit of the depending sleeve 13 of said disc.

Since the lower closure ring 23 cannot completely cover the lower disc in the manner the upper closure plate 21 covers the upper disc, and since it is contemplated that the space within the ring gear, between the discs 11 and 12, shall constitute an oil reservoir, the inner surfaces of the lower flanges 18 of the gear are preferably provided with an oil seal ring 25 effective against the periphery of the lower disc to prevent leakage of oil downwardly from the oil reservoir between these parts.

The bearing sleeve 13, depending from the lower guide disc 12, is journalled in the vertical, tubular bearing housing 26 of a supporting pedestal 27, whose base 28 is apertured, as seen at 29, for bolted connection upon a suitably prepared foundation (not shown). The lower portion of said sleeve 13 is reduced forming an annular, downwardly facing shoulder, as also plainly seen in Figure 2, seating on an anti-friction bearing 30. This bearing 30 is preferably supported on an internal annular flange 31 of the pedestal housing 26, at a point substantially above the pedestal base 28, to form a gear compartment therein above the said base. The bottom of this gear compartment, it will be noted, is independently closed by a closure plate 32.

Through the bearing sleeve 13 a shaft 33 extends, its upper portion having a pinion 34 suitably fixed thereon between the guide discs 11 and 12, and held firmly in engagement, and proper depth of mesh, with the teeth of the toothed inner rib 17 of the gear, by reason of the cooperation of the said guide discs.

The upper end of the shaft 33, above and below its pinion 34, is journalled in anti-friction bearings 35 and 36, in portions of the discs 11 and 12, and preferably these bearings 35 and 36 are of the combined radial and thrust type.

At its lower portion, shaft 33 has a reduced depending extension 37, below bearing sleeve 13, forming an annular shoulder which engages an anti-friction bearing 38, seated on an internal flange 39 of sleeve 13 adjacent to its lower end. The reduced portion or extension 37 has fixed thereon, within the above mentioned gear compartment of the pedestal base, a bevel gear 40, which is engaged by a beveled pinion 41 on the inner end of a high speed drive shaft 42. This shaft 42 is journalled, near its pinion 41, through a bearing 43 in the side wall of the gear compartment, and in practice extends beyond the central power of the present invention, to a point where it may be conveniently connected, by belt or other suitable direct driving connection with a source of power such as an electric motor, or internal combustion engine.

It is thus obvious that upon rotation of shaft 33, through the application of power by way of drive shaft 42 and gearing 41, 40, the pinion 34 walks or crawls around the internally toothed inner rib 17 of the ring gear 10. In so doing, the ring gear is bodily shifted in a circular path of which the axis of shaft 33 is the center, since it is under constant guidance of the discs 11 and 12 freely swinging about the same center.

In order, however, to steady the ring gear in its movements, and avoid any possibility of jerky rotary or oscillating movements thereof, it is preferable to provide the same with a rigidly outstanding guide arm or bar 45, whose inner end may have a bracket 46 securely fastened to the ring gear through a pair of the gear openings 15. The outer end of this arm or bar 45 may be pivotally connected at 47 to one end of a swinging lever 48 whose opposite end may be similarly supported on a stationary pedestal and the like 49. With the parts thus connected, it is assured that the ring gear will be constrained to bodily move in its circular path and that in the course of its movement, each pull rod 16 will be shifted in the direction of its length, for operating the pump jack of the well which it serves.

It is obvious, furthermore, that the above construction admits of the running of all geared parts in oil to effect thorough lubrication at all times without requiring the attention of an operator, and that the invention provides a central power of simple, rugged strength and great durability.

Having thus fully described my invention, what I claim is:

1. A central power comprising a support, a driven shaft journalled uprightly in said support, a shaftless low speed gear member disposed horizontally above the support, having means peripherally therearound for attaching rod pulls, and having an internally toothed portion, guide discs above and below said gear and peripherally in bearing connection therewith at opposite sides of the said toothed portion said side discs closing opposite sides of the shaftless gear and having bearings therein for the upper portion of the said driven shaft, the lower guide disc having a tubular, eccentrically depending bearing sleeve journalled independently of said shaft bearings in the support around, and co-axially with, said shaft, and a pinion on the shaft between its upper bearings in mesh with the internal teeth of the gear.

2. A central power comprising a support having an upright tubular portion, a pair of upper and lower horizontally disposed and connected guide discs, the lower disc having an eccentrically disposed tubular bearing sleeve depending therefrom, and journalled in the said support, a shaftless low speed ring gear between, and extending peripherally beyond, said discs, said gear having an internally toothed rib and portions in bearing connection around the peripheries of the discs, a shaft having its upper portion extending through the ring gear and having bearings in both of said guide discs in co-axial relation to said bearing sleeve, a pinion fixed on said shaft in mesh with the gear teeth, and means for driving said shaft.

3. A central power comprising a shaftless, horizontally disposed and internally toothed ring gear having means externally therearound for attaching rod pulls, means in rotatably and perepherally bearing connection with said ring gear for supporting and guiding the same in its movements, said means consisting of upper and lower closure members connected to one another through the space within the ring gear, and having an eccentrically depending bearing member, a support in which said bearing member is uprightly journalled, a shaft rising in said support in co-axial relation to the said bearing member and having a pinion thereon in mesh with the teeth of the ring gear, and means for driving said shaft.

4. A central power including a shaftless horizontally disposed, internally toothed ring gear, having means peripherally therearound for attaching rod pulls, an eccentrically swinging supporting member in peripheral, rotatable bearing contact around, and within, said ring gear, an upright support in which said supporting member is eccentrically journalled, and a driven shaft rotatable in co-axial relation to the swinging movement of said supporting member, having bearings at its upper portion in said swinging support, and having a pinion thereon in mesh with the teeth of the ring gear.

5. A central power including shaftless horizontally disposed, internally toothed ring gear, having means peripherally therearound for attaching rod pulls, an eccentrically swinging supporting member in peripheral, rotatable bearing contact around, and within, said ring gear and including a pair of circular supporting discs in rigidly spaced connection with each other through the space within the ring gear for closing the upper and lower sides of the ring gear, an upright support in which said supporting member is eccentrically journalled, and a driven shaft rotatable in co-axial relation to the swinging movement of said supporting member, having bearings at its upper portion in said supporting discs and having a pinion thereon in mesh with the teeth of the ring gear.

6. In a central power, a shaftless, internally toothed, horizontal ring gear, having peripheral means for attaching rod pulls thereto, a guide member peripherally rotatably interfitting and supporting said ring gear and having an eccentric support on which it is swingable, and means for actuating the ring gear including a pinion in mesh with its internal teeth on an axis coincident with the axis of swinging movement of the guide member.

7. In a central power, a shaftless, horizontally disposed ring gear, having an internally toothed inner rib and having external peripheral means for attaching rod pulls thereto, a guide member consisting of discs rotatably interfitting portions of the ring gear above and below its toothed rib and closing the upper and lower sides of the ring gear, means extending through the space within the ring gear and rigidly connecting and spacing said discs, means forming an eccentric bearing on which said guide member is swingable, and means for actuating the ring gear including a pinion in mesh with its internal teeth on an axis coincident with the axis of swinging movement of the guide member.

8. In a central power, a shaftless, internally toothed, horizontal ring gear, a driven shaft upstanding eccentrically through said ring gear and having a pinion thereon in mesh with the internal teeth thereof, upper and lower discs having eccentrically disposed bearings for said shaft above and below said pinion, and connected through the space within the ring gear for closing opposite sides of the latter, said discs being thus mounted to swing eccentrically about an axis coincident with the axis of the pinion shaft, and being in peripheral bearing connection with the ring gear for supporting the latter in its movements and maintaining the same and the shaft pinion in constant, uniform mesh, and means in connection with the said shaft for driving the same.

CHARLES M. O'LEARY.